United States Patent
Courson

(10) Patent No.: US 9,335,190 B1
(45) Date of Patent: May 10, 2016

(54) FITTING FOR USE IN FUEL GAS SYSTEMS AND APPLICATIONS USING SAME

(75) Inventor: Paul A. Courson, Lake Village, AR (US)

(73) Assignee: PRESTO-TAP, LLC, Greenville, MI (US)

(*) Notice: Subject to any disclaimer, the term of this patent is extended or adjusted under 35 U.S.C. 154(b) by 950 days.

(21) Appl. No.: 13/170,580

(22) Filed: Jun. 28, 2011

Related U.S. Application Data

(60) Provisional application No. 61/359,168, filed on Jun. 28, 2010.

(51) Int. Cl.
*G01F 1/42* (2006.01)
*G01F 1/34* (2006.01)
*F16K 15/20* (2006.01)

(52) U.S. Cl.
CPC . *G01F 1/42* (2013.01); *F16K 15/20* (2013.01); *G01F 1/34* (2013.01)

(58) Field of Classification Search
CPC ........... F16K 15/20; F16K 27/02; G01F 1/42; G01F 1/34
USPC ............... 137/315.01, 454.5, 234.5, 884
See application file for complete search history.

(56) References Cited

U.S. PATENT DOCUMENTS

| | | | | |
|---|---|---|---|---|
| 1,438,081 A | * | 12/1922 | Allen | 137/234.5 |
| 2,103,108 A | * | 12/1937 | Broecker et al. | 137/234.5 |
| 2,275,288 A | * | 3/1942 | Crowley | 137/454.5 |
| 4,702,754 A | * | 10/1987 | Blocker | 137/232 |
| 6,164,142 A | * | 12/2000 | Dimeff | 73/861.61 |
| 6,199,583 B1 | | 3/2001 | Iacovella | |
| 6,719,002 B2 | | 4/2004 | Shaw | |
| 6,843,138 B2 | * | 1/2005 | Pollard | 73/861.52 |
| 6,845,969 B2 | * | 1/2005 | Kayukawa | 251/334 |
| 8,695,619 B2 | * | 4/2014 | Kissinger | 137/315.01 |
| 8,701,497 B2 | * | 4/2014 | Grenning | 73/716 |

* cited by examiner

*Primary Examiner* — Kevin Lee
(74) *Attorney, Agent, or Firm* — Stites & Harbison, PLLC; Jeffrey A. Haeberlin

(57) ABSTRACT

A fitting is for use in a fuel gas system having an access port for providing access to the system. The fitting includes a fitting body and a valve core. The fitting body includes: a first end for providing mating connection of the fitting body to the access port, a second end for providing connection of an accessory, and a central bore of at least 13/64" through the fitting providing an opening through the fitting body between the first end and the second end. The valve core is removably received in a valve receiving means of the fitting body, and includes a valve operator actuatable to open a fluid connection between the first end and the second end. The valve core is removable from the fitting body so that an unobstructed volume of the central bore can be available for a flow of fuel gas into the system.

1 Claim, 11 Drawing Sheets

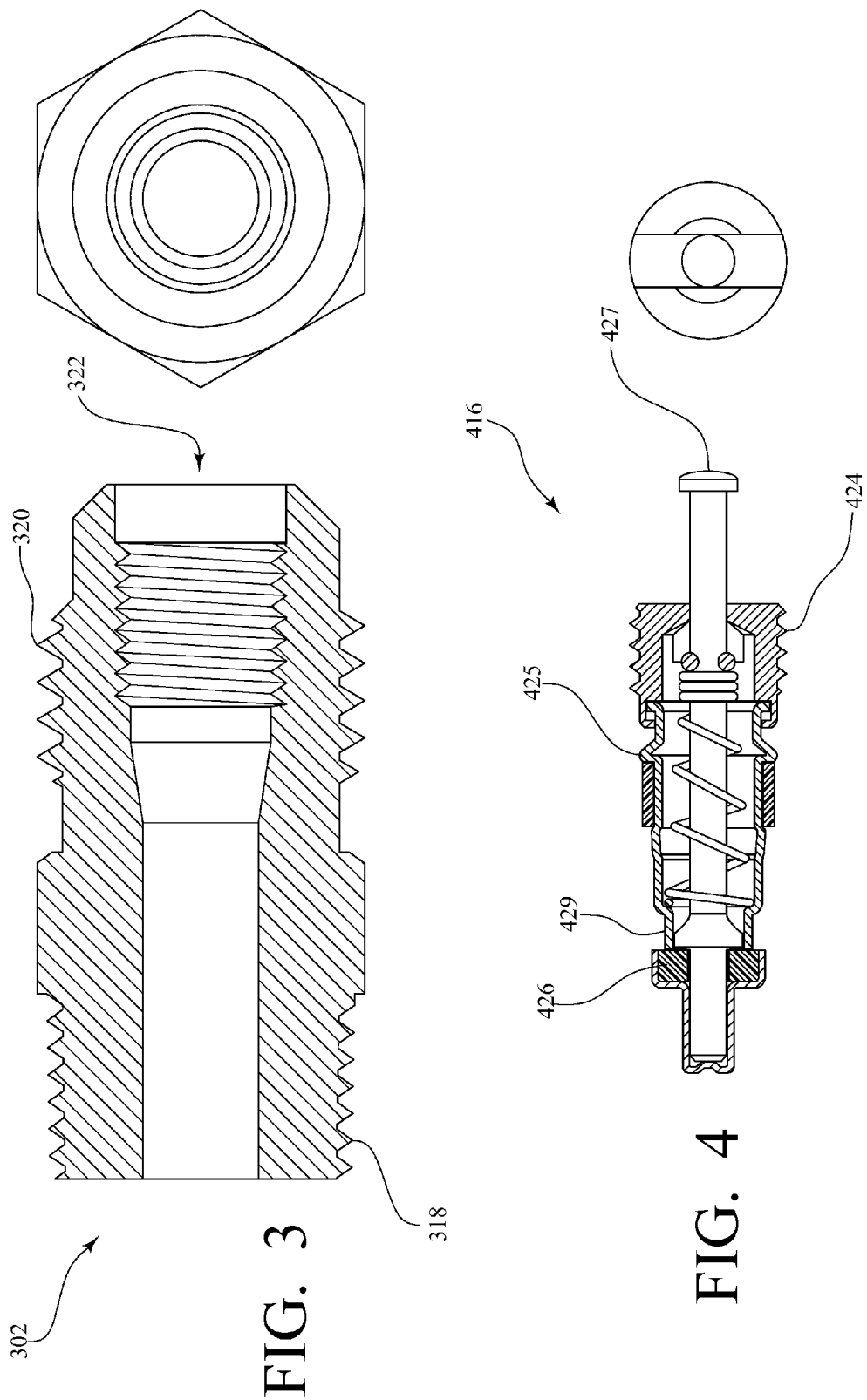

FITTING FOR USE IN FUEL GAS SYSTEMS AND APPLICATIONS USING SAME

CROSS-REFERENCE TO RELATED APPLICATIONS

This application claims the benefit of U.S. Provisional Patent Application No. 61/359,168, filed Jun. 28, 2010, the entire disclosure of which is hereby incorporated by reference.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable

INCORPORATION-BY-REFERENCE OF MATERIAL SUBMITTED ON A COMPACT DISC

Not applicable.

BACKGROUND OF THE INVENTION

1. Field of the Invention

The presently-disclosed subject matter relates to a fitting for use in fuel gas systems and applications using the same.

2. Background Art

Fuel gas systems (e.g., propane or natural gas piping systems for distribution and metering of fuel gas to end users such as business and residential customers) are generally closed systems without ready access into the system for such purposes as: a) leak testing; b) testing of differential pressures in rotary and diaphragm meters; c) supplying gas from a cylinder to the system while maintenance is performed such as meter and regulator replacement; and d) testing operation of a relief valve.

Prior art fittings for accessing fuel gas systems have flexible seats or seals held in a housing through which access to the system requires the use of metal probes or needles which are forced through the seats and into the system. The use of lubrication between the probes or needles and the flexible seats is required when using such prior art fittings. The seats can leak below 45 degrees Fahrenheit due to memory problems. Further, such prior art fittings require the use of safety goggles and gloves because the probes can potentially "blow out" of the fitting and cause injury.

Another way that that access into the system could be provided would be by providing permanent bypass valves and associated piping in the system. However, providing such permanent bypass valves and piping is both expensive and difficult with which to work.

With respect to leak testing, fuel gas leaks, including propane and natural gas leaks, can cause serious problems from both a health and safety standpoint. For example, fires resulting from such leaks can cause both property damage and personal injury including, in some cases, death.

At present, two tests are generally required as set out in NFPA Pamphlet 54, a safety code that applies to the installation of fuel gas piping systems, appliances, equipment, and related accessories. First, a pressure test must be performed on the piping installed in a fuel gas system. The second test that must be performed is a leak test on the functional fuel gas system.

The pressure test is usually performed at 1½ times the system working pressure, but not less than 3 psig. Thus, fuel gas appliances or other devices must not be connected to the system so appliance controls are not damaged. Also, air or inert gas is used instead of the anticipated fuel to be used during normal operations. As such, the air or inert gas must generally be purged from the system prior to use of the selected fuel.

The leak test is generally performed after appliances or other such devices are attached to the fuel gas system and can be performed with the fuel gas that is used in the system. As such, the leak test is designed to test for leaks in the entire system, including the fuel delivery source location, regulators, meters, piping, and appliance control modules. Further, a leak test is also required anytime there has been an interruption in the fuel gas system (e.g., an interruption in service).

Additionally, access to fuel gas systems is required for performing testing of differential pressures in rotary and diaphragm meters, supplying gas from a cylinder to the system while maintenance is performed such as meter and regulator replacement, and testing operation of a relief valve.

BRIEF SUMMARY OF THE INVENTION

In accordance with one aspect of the invention, a fitting is for use in a fuel gas system having an access port for providing access to the system. The fitting includes a fitting body and a valve core. The fitting body includes: a first end for providing mating connection of the fitting body to the access port, a second end for providing connection of an accessory to the fitting body, and a central bore of at least 13/64" completely through the fitting along a longitudinal axis thereof providing an opening completely through the fitting body between the first end and the second end. The valve core is removably received in a valve receiving means of the fitting body, and includes a valve operator actuatable to open a fluid connection between the first end and the second end. The valve core is removable from the fitting body so that a full, unobstructed volume of the central bore can be available for a flow of fuel gas into the fuel gas system.

According to one implementation, the first end includes ¼" MNPT threads for providing the mating connection of the fitting body to the access port, and the second end includes 7/16-20 UNF threads for providing connection of the accessory to the fitting body.

In accordance with another aspect of the invention, a method is for supplying fuel gas from an alternate fuel source to a fuel gas system while upstream maintenance is performed. The method includes: providing a shutoff valve downstream of the maintenance to be performed; providing an access port downstream of the shutoff valve, the access port for providing access to the fuel gas system; and installing a fitting in the access port. The fitting includes: a fitting body including: a first end for providing mating connection of the fitting body to the access port, a second end for providing connection of an accessory to the fitting body to, and a central bore of at least 13/64" completely through the fitting along a longitudinal axis thereof providing an opening completely through the fitting body between the first end and the second end; and a valve core removably received in a valve receiving means of the fitting body and including a valve operator actuatable to open a fluid connection between the first end and the second end, the valve core removable from the fitting body so that a full, unobstructed volume of the central bore can be available for a flow of fuel gas into the fuel gas system. The method further includes providing a core removal tool assembly which includes: a hollow body; a swivel connector at a fitting end of the hollow body; a core removal rod assembly connected at an opposite end of the hollow body, the core removal rod assembly including a core removal rod having means for engaging and removing the valve core; a ball valve at a middle of the hollow body, the ball valve having a first position in which the fitting end is in communication with the opposite end and the core removal rod can extend through the ball valve, and a second position in which the fitting end is isolated from the opposite end; and a fuel supply receiving port between the swivel connector and the ball valve. Continuing with the method, the method further includes: attaching an alternate fuel supply to the fuel supply receiving port; attaching the swivel connector to the second end of the fitting; removing the valve core from the fitting using the core removal rod; retracting the core removal rod and the valve core through the ball valve, allowing the alternate fuel supply to communicate with the fuel gas system through the full, unobstructed volume of the central bore; closing the ball valve; and closing the shutoff valve so that the fuel gas system is supplied by fuel gas from the alternate fuel source while maintenance is performed upstream of the shutoff valve.

In accordance with another aspect of the invention, a method is for testing for leaks in a fuel gas system having an access port for providing access to the system and a valve positioned upstream of the access port. The method includes installing a fitting in the access port. The fitting includes: a fitting body including a first end for providing mating connection of the fitting body to the access port, a second end for providing connection of an accessory to the fitting body to, and a central bore along a longitudinal axis thereof providing an opening completely through the fitting body between the first end and the second end; and a valve core removably received in a valve core receiving means in the fitting body and including a valve operator actuatable to open a fluid connection between the first end and the second end. The method also includes: attaching a pressure gauge to the second end of the fitting, the pressure gauge including an actuator for actuating the valve operator and exposing the pressure gauge to a pressure of the system; closing the upstream valve; and monitoring the pressure gauge for a change in measured pressure indicating a leak in the fuel gas system downstream of the upstream valve.

In accordance with yet another aspect of the invention, a method is for testing for leaks in a fuel gas system having an access port for providing access to the fuel gas system, the fuel gas system being isolated from a primary fuel supply. The method includes installing a fitting in the access port. The fitting includes: a fitting body including a first end for providing mating connection of the fitting body to the access port, a second end for providing connection of an accessory to the fitting body to, and a central bore along a longitudinal axis thereof providing an opening completely through the fitting body between the first end and the second end; and a valve core removably received in a valve core receiving means in the fitting body and including a valve operator actuatable to open a fluid connection between the first end and the second end. The method further includes attaching a portable cylinder assembly to the second end of the fitting. The portable cylinder assembly comprises: a portable cylinder containing a compressed gas; a portable cylinder connector attached to the portable cylinder and providing access to the compressed gas in the portable cylinder; a control valve in communication with the connector and located downstream of the connector, the control valve for controlling flow of the compressed gas from the cylinder to the fuel gas system; an pressure gauge in communication with the control valve, the pressure gauge for determining a pressure downstream of the control valve; and a fuel gas system connector in communication with the pressure gauge, the fuel gas system connector including an actuator for actuating the valve operator and placing the portable cylinder assembly in communication with the fuel gas system. The method further includes: opening the control valve to pressurize the fuel gas system with the compressed gas of the portable cylinder assembly; closing the control valve; and monitoring the pressure gauge for a change in measured pressure indicating a leak in the fuel gas system.

In accordance with yet another aspect of the invention, a fuel gas system includes: a fuel gas meter having a fuel input access port and a fuel output access port; a first fitting in communication with the fuel input access port; and a second fitting in communication with the fuel output access port. Each of the first fitting and the second fitting includes: a fitting body including: a first end for providing mating connection of the fitting body to the respective access port, a second end for providing connection of an accessory to the fitting body to, and a central bore along a longitudinal axis thereof providing an opening completely through the fitting body between the first end and the second end; and a valve core removably received in a valve core receiving means in the fitting body and including a valve operator actuatable to open a fluid connection between the first end and the second end.

According to still another aspect of the invention, a method is for testing an external relief valve of a fuel gas system, the fuel gas system including an upstream valve upstream of a regulator, a downstream valve downstream of the regulator, the external relief valve being connected to a downstream side of the downstream valve. The method includes providing a first fitting on a downstream side of the upstream valve and a second fitting between the downstream side of the downstream valve and the external relief valve. Each of the first fitting and the second fitting includes: a fitting body including a first end for providing mating connection of the fitting body to the access port, a second end for providing connection of an accessory to the fitting body to, and a central bore along a longitudinal axis thereof providing an opening completely through the fitting body between the first end and the second end; and a valve core received in a valve core receiving means in the fitting body and including a valve operator actuatable to open a fluid connection between the first end and the second end. The method further includes: connecting a hose assembly between the first fitting and the second fitting, the hose assembly including a hose, an adapter on each end thereof, and a pressure gauge for indicating the pressure in the hose, each adapter including an actuator for actuating the respective valve operator; closing the downstream valve; slowly opening the upstream valve to provide increasing gas pressure to the external relief valve to the point of discharge of the external relief valve; and recording the pressure indicated on the pressure gauge at the point of discharge of the external relief valve.

BRIEF DESCRIPTION OF THE SEVERAL
VIEWS OF THE DRAWINGS

These and other features, aspects, and advantages of the present invention will become better understood with regard to the following description, appended claims, and accompanying drawings, where:

FIG. 3 is a side sectional view of a fitting body of an exemplary fitting according to the invention.

FIG. 4 is a partial sectional view of a valve core of an exemplary fitting according to the invention.

DETAIL DESCRIPTION OF EXEMPLARY EMBODIMENTS OF THE INVENTION

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the following terms are believed to be well understood by one of ordinary skill in the art, the following definitions are set forth to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims. Thus, for example, reference to "a valve" includes a plurality of such valves, and so forth.

As used herein, the term "fitting" means a device for providing access or connection to a fuel gas system.

The presently-disclosed subject matter includes a fitting for use in fuel gas systems and applications using the same.

A. Environment

Figure 1:
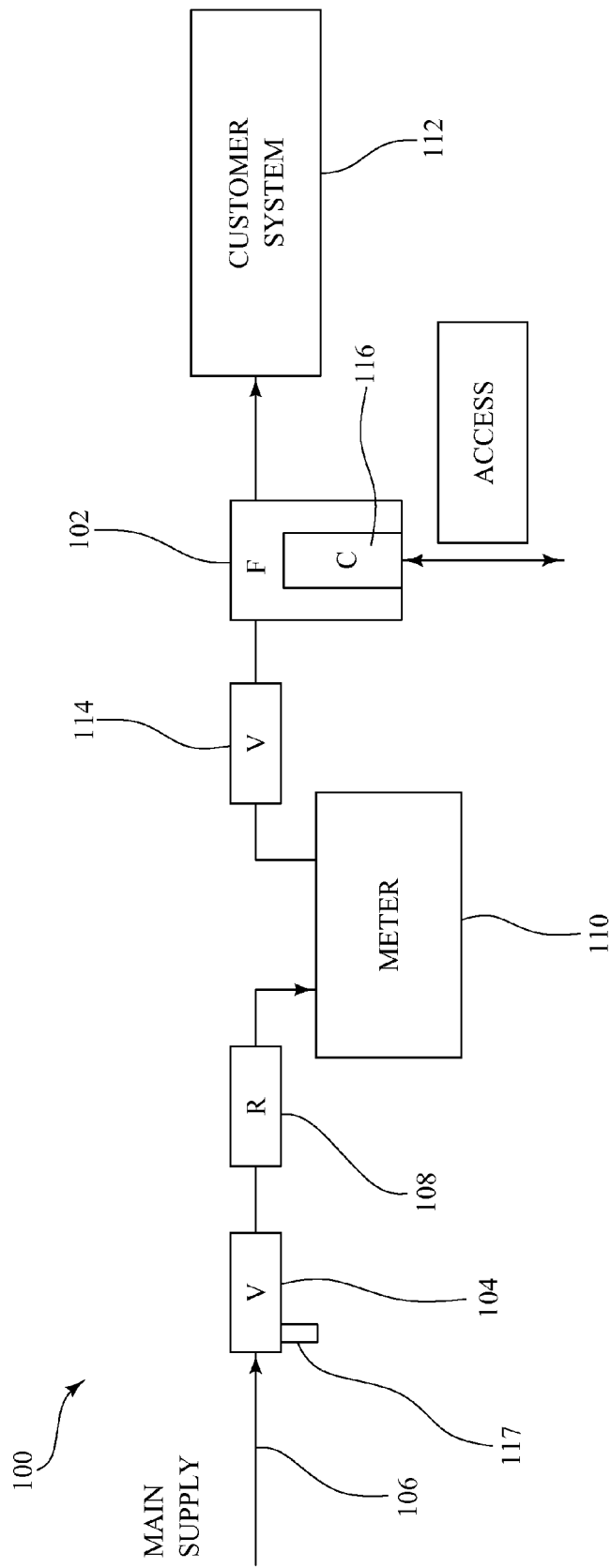
FIG. 1 is a functional block diagram of an exemplary fuel gas system where an exemplary fitting according to the invention is utilized.

Referring to FIG. 1, there is shown a portion of an exemplary fuel gas system 100 where an exemplary fitting 102 is utilized, including a first valve 104 for controlling a flow of fuel gas from a main supply line 106, a regulator 108 for regulating a pressure of fuel gas from the first valve 104, a meter 110 for measuring an amount of fuel gas utilized by a customer system 112, and a second valve 114 for controlling the flow of fuel gas from the meter 110. In typical use, an actuator in a mating adapter screws onto the fitting 102, which depresses a valve core 116 of the fitting 102, described in more detail below, thereby allowing access into the system without tools and without the problems of the prior art fittings described above.

Optionally, the first valve 104 of the fuel gas system 100 may include a bypass port 117, providing access to the fuel gas of the main supply line 106 when the first valve 104 is closed.

Figure 2:
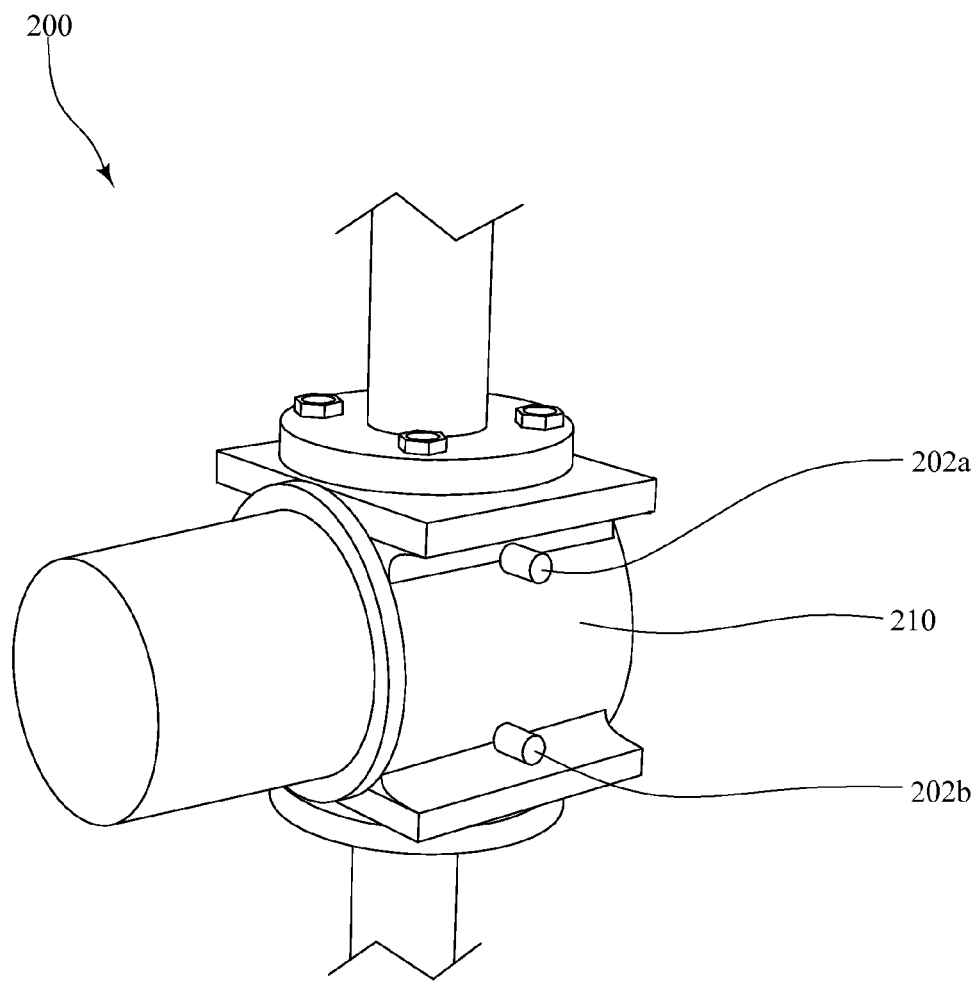
FIG. 2 is a perspective view of portion of an exemplary fuel gas system according to an embodiment of the invention.
Figure 12:
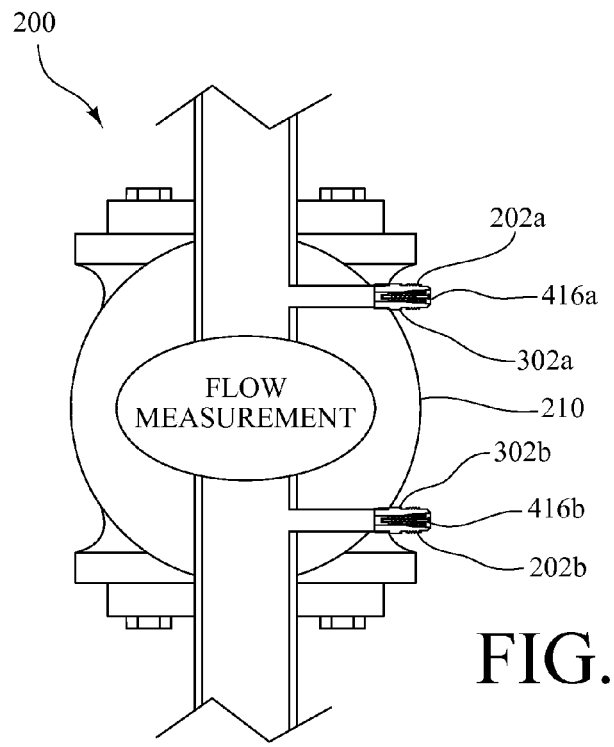
FIG. 12 is a schematic diagram corresponding to the exemplary fuel gas system of FIG. 2.

FIG. 2 and FIG. 12 show a portion of an exemplary system 200 where a first exemplary fitting 202a and a second exemplary fitting 202b are positioned on either side of a meter 210 to allow access into the system 200 for differential pressure testing of the meter 210. The first exemplary fitting 202a and the second exemplary fitting 202b are in respective communication with either a fuel output access port or a fuel input access port of the meter 210, and each includes a fitting body 302a, 302b and a valve core 416a, 416b, which are described in more detail below.

B. The Fitting

FIG. 3 is a sectional view of an exemplary fitting body 302 according to the invention. The fitting body 302 includes a ¼ inch MNPT portion 318 (adjacent to a first end 319 (see FIG. 13)) for attachment in-line to a fuel gas system (e.g., fuel gas system 100 of FIG. 1). The fitting body 302 also includes a 7/16-20 UNF thread attachment section 320 (adjacent to a second end 321 (see FIG. 13)) for attaching an accessory to the fitting body 302, such as a pressure gauge, a leak test hose apparatus, or a core removal tool, as will be discussed later. The fitting body 302 defines a 13/64 inch bore 322 through the fitting body 302 along a longitudinal axis thereof. The 13/64 inch bore 322 provides a flow of natural gas at 12" water column capable of supplying at least 120,00 BTUs, or propane gas at 12" water column capable of supplying at least 280,000 BTUs. A valve core of the fitting body 302 is described in more detail below in conjunction with FIG. 4.

Preferably, the maintenance to be performed on meters and regulators is performed during the summer months, when fuel gas demand in a residential application is generally limited to water heater usage and, potentially, to a stove/range, both of which applications require substantially less usage, even combined, than the capabilities described above.

FIG. 4 is a partial sectional view of an exemplary valve core 416 for use with the exemplary fitting body 302 (FIG. 3).

Figure 13:
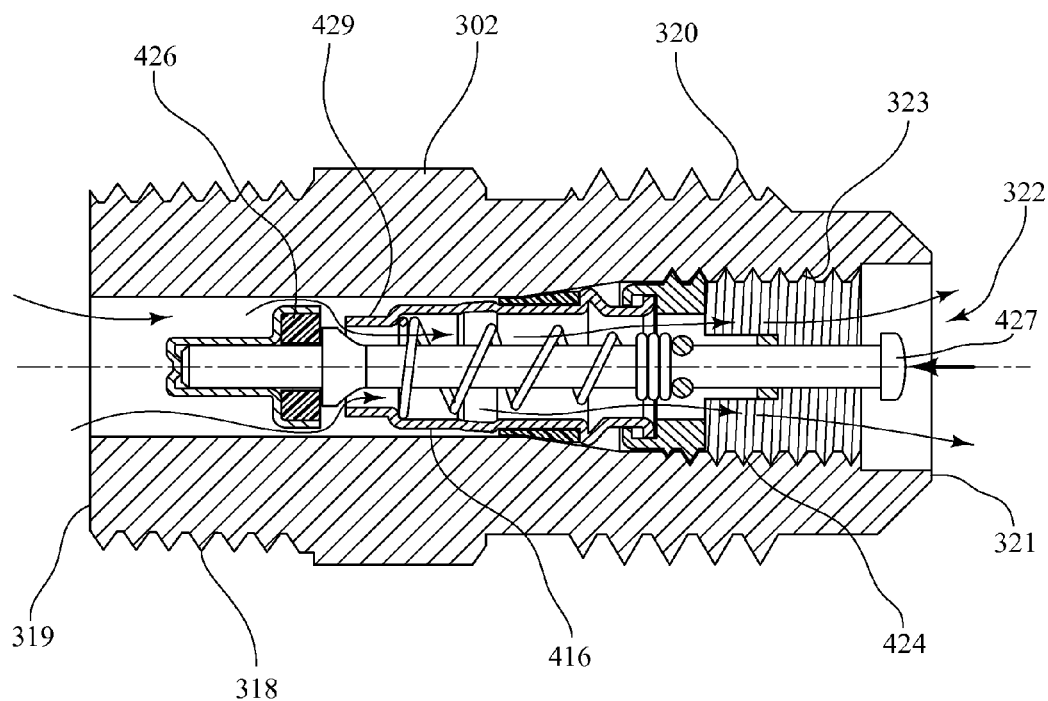
FIG. 13 is a partial sectional view of the valve core of FIG. 4 received within the fitting body of FIG. 3, where a valve operator of the valve core is actuated to allow a fluid connection between first and second ends of the fitting body through the valve core.

FIG. 13 is a partial sectional view of the valve core 416 of FIG. 4 received within the fitting body 302 of FIG. 3, where a central pin 427 (i.e., a valve operator) of the valve core 416 is actuated to allow a fluid connection between the first end 319 and the second end 321 of the fitting body 302 through the valve core 416.

Referring to FIG. 3, FIG. 4, and FIG. 13, in use, the valve core 416 is received within the bore 322 of the fitting body 302 via threads 424 that mate with threads 323 (i.e., a valve receiving means) in the interior of the 7/16-20 UNF thread attachment section 320. The valve core 416 includes a positive stop feature 425 that seats in a portion of the bore that "necks down" to 0.176" (which still provides a flow of fuel gas capable of supplying at least 120,000/280,000 (natural gas/propane gas) BTUs, as discussed above). In use, the central pin 427 (i.e., a valve operator) of the valve core 416 pushes a washer 426 away from a body 429 of the valve core 416, allowing a fluid connection between the first end 318 and the second end 321 of the fitting body 302 through the inside of the valve core 416. The washer 426 comprises Viton® fluoroelastomer, or the like, for enabling use of the valve core 416 in fuel gas systems (natural gas and propane gas).

C. Application 1

Leak Testing with a Gauge Only

According to one application, an appropriate gauge for a system to be tested is attached to the fitting (e.g., FIG. 1, fitting 102) using an adapter that screws onto the fitting (FIG. 1, fitting 102) by hand without the use of tools. The pressure gauge includes an actuator for depressing (actuating) the valve core (e.g., FIG. 4, valve core 416) and allowing the gauge the detect the pressure of a pressurized fuel gas system (e.g., FIG. 1, fuel gas system 100) (i.e., exposing the pressure gauge to the pressure of the system). Then, a valve (e.g., FIG. 1, first valve 104 or second valve 114) upstream of the fitting is closed. If there are no leaks in the system downstream of the valve, the gauge will indicate that the system is holding pressure. Otherwise, the system will not hold pressure and the gauge will indicate falling pressure or no pressure once the gas in the system has escaped through the leak and the pressure of the system has equalized with the pressure outside of the system.

Advantageously, the fitting (e.g., FIG. 1, fitting 102) allows, without tools, leak testing of a system and using the same fitting as for pressure testing of the system.

D. Application 2

Leak Testing with a Portable Cylinder Assembly

Figure 5:
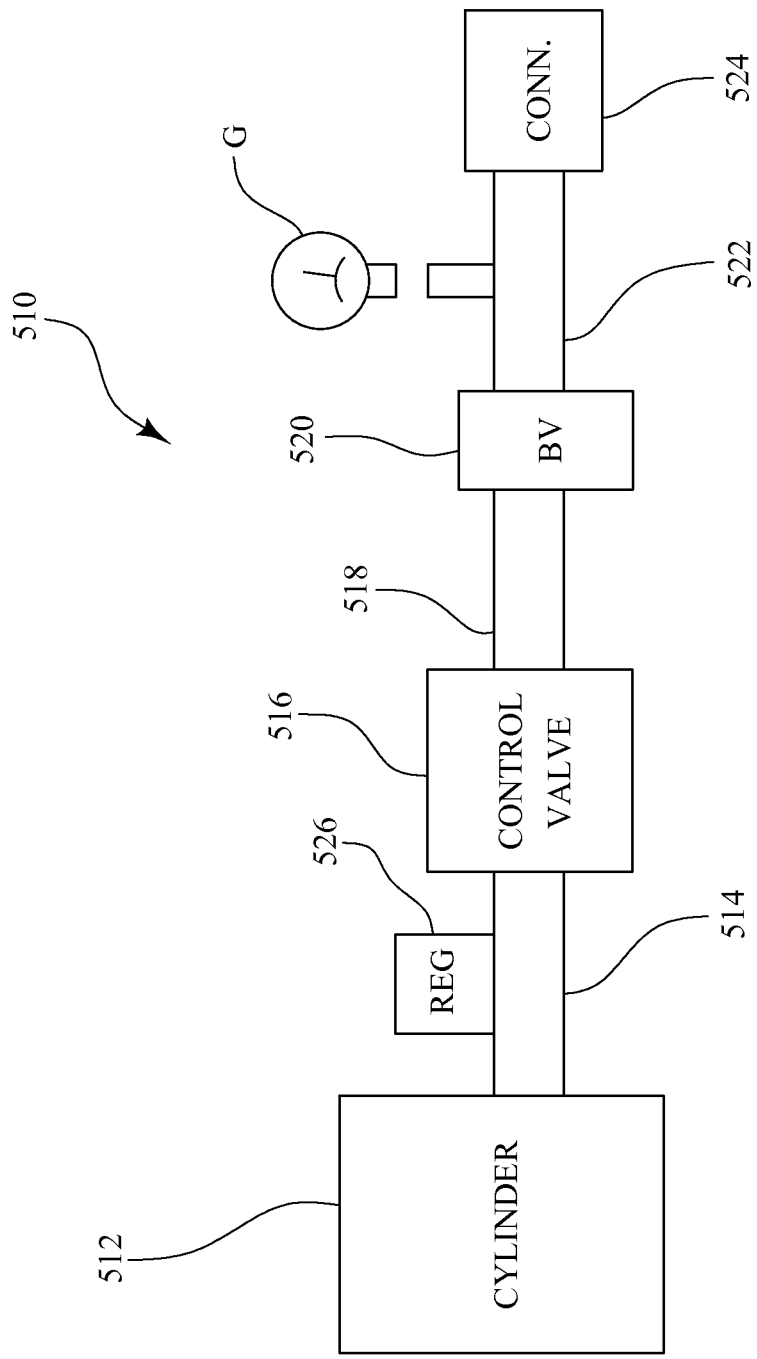
FIG. 5 is a functional block diagram of an exemplary portable cylinder assembly for use in a method for testing for leaks in a fuel gas system or in a method for supplying fuel gas from an alternate fuel source to a fuel gas system, in accordance with aspects of the invention.

FIG. 5 is a block diagram of an exemplary portable cylinder assembly 510, including a portable cylinder 512 containing a compressed gas. A connector 514 is secured or attached to the portable cylinder 512 and provides access to the compressed gas within the cylinder 512. A control valve 516 is connected downstream of the connector 514 for controlling the flow of gas from the portable cylinder assembly 510 to the desired location in the fuel gas system. A hose 518 or other suitable connecting element is used to connect the control valve 516 to a bleeder valve 520 which is used to reduce pressure downstream of the bleeder valve 520. The assembly 510 also includes a suitable instrument fitting 522 for enabling connection of the assembly 510 to a desired test instrument device, denoted G, as described in more detail below. A suitable connector 524, such as a quick adapter, enables connection of the assembly 510 to a fitting (e.g., FIG. 1, fitting 102) of a fuel gas system (e.g., FIG. 1, fuel gas system 100).

In some embodiments, a conventional regulator, denoted 526, is provided to control the pressure of the gas delivered from the cylinder 512 so as to ensure that the pressure is adequate for testing purposes, as described in more detail below.

Considering some of the components of assembly 510 in more detail, in general, portable cylinder 512 can comprise any portable cylinder capable of containing a compressed gas. The term "compressed gas" is used herein to refer to any compressed gas, including both flammable and inert gases, that are suitable for testing fuel gas systems. Examples of such gases include, but are not limited to, natural gas, propane, carbon dioxide, nitrogen, butane, argon, propylene, air, fluorocarbons such as refrigerants, and helium. Typically, connector 514 is an integral outlet port that forms part of the portable cylinder 512 so as to provide access to the compressed gas.

The control valve 516 is located downstream to control flow of the compressed gas from the portable cylinder 512 to the fuel gas system. In exemplary embodiments, the control valve can comprise a conventional valve such as a needle valve, a shutoff valve, or a ball valve.

The bleeder valve 520 is used to selectively "bleed off" some of the pressure, i.e., to reduce pressure in the system downstream of the bleeder valve 520 to a value below the designed working pressures of gas regulators so that a test instrument device, such as a gauge, water manometer, or other suitable instrument, can communicate with, i.e., is used to measure parameters associated with, the complete gas system.

The instrument fitting 522 is installed in the assembly 510 so as to enable the test instrument device G to be attached to the assembly 510 and used to obtain pressure readings used to perform leak and pressure tests. In some embodiments, the instrument fitting 522 includes first and second inline openings such that the instrument fitting 522 can be connected in line in the assembly 510 between one or more components of the assembly, and a third opening located between the first and second openings adapted to receive the test instrument device G that monitors pressure in the fuel system. In one preferred embodiment, instrument fitting 522 comprises a Presto-Tap TPF fitting available from Presto-Tap LLC of Greenville, Miss.

As indicated above, the connector or adaptor 524 is used to connect the assembly to a compatible fitting (e.g., FIG. 1, fitting 102) installed in the fuel gas system so as to provide communication between the fuel gas system and the assembly 510 and thus enable a user to perform such functions as determining the presence of gas, to determining the pressure in the system, and/or pressurizing the system from the portable cylinder assembly 510 to facilitate the detection of a leak. In one preferred embodiment, the connector 524 comprises a Presto-Tap RV-QA and is used to make connection to a Presto-Tap RV valve that has been previously installed in the gas system at the desired location.

As stated previously, in some embodiments the regulator 526 is employed for controlling pressure of the gas output from the portable cylinder 512. The regulator 526 is capable of delivering a pressure that is adequate for testing fuel gas systems at the designed working pressure of the fuel gas system at a the desired test location (e.g., 7" WC, 11" WC, 10 psi, and 30 psi and the static pressure of the compressed gas in cylinder 12). This enables pressure testing and leak testing to be carried out prior to the initial service connection to a gas supply.

The assembly 510 described above can be used with a number of different fuel gas systems, including any domestic or industrial gas system utilizing vapor that can be isolated from a fuel supply at the supply source (e.g., a gas main or a propane tank). Such fuel gas systems include, but are not limited to, residential gas systems, industrial gas systems, commercial gas systems, engines powered by gas, manufactured homes containing a fuel gas system, and recreational vehicles containing a fuel gas system.

A method for detecting leaks in a fuel gas system in accordance with an embodiments of the invention comprises providing a leak detection assembly according to one or more embodiments described above; attaching the assembly to a fuel gas system; pressurizing the fuel gas system to a desired pressure by opening and closing a control valve of the assembly; and using a detecting device fitted to the assembly to detect any decrease in pressure, thereby indicating a leak in the fuel gas system.

In some embodiments of the leak detecting method, the method includes first ensuring that any inlets for the fuel gas supply are closed. In these embodiments, the assembly 510 is attached to the fuel gas system (e.g., FIG. 1, fuel gas system 100) by the connector or adaptor 524 and the control valve 516 is opened and then closed. When this is done, the system is thereby pressurized from the portable cylinder 12 to a desired pressure. After releasing a recommended amount of pressure depending on the application, using the bleeder valve 520, the pressure of the complete system, including the fuel gas system and the assembly 510, is then observed, using the test instrument device G received in fitting 522, for any increases or decreases in pressure readings. This is done for a period of time sufficient to satisfy any Federal, State, and Local codes for the particular industry regulatory authority. In general, an increase in observed pressure indicates that the fuel gas system is being fed by a pressure source while a decrease in pressure indicates that there is a leak in the fuel gas system, which can then be located and repaired.

E. Application 3

Testing Differential Pressures in Rotary and Diaphragm Meters

Returning to FIG. 2, as previously indicated, the first exemplary fitting 202a and the second exemplary fitting 202b are positioned on either side of the meter 210 to allow access into the system 200 for differential pressure testing of the meter 210.

Advantageously, the exemplary fitting (e.g., FIG. 1, fitting 102), or a fitting having a bore smaller than 13/64 inch (since this application only requires detecting pressures on either side of the meter 210), provides ease of use, allowing the differential pressure testing of the meter 210 to be conducted without the use of tools, probes, safety glasses, or gloves, and eliminates any possibility that a lubricated probe could "blow out" and potentially cause injury.

F. Application 4

Figure 6:
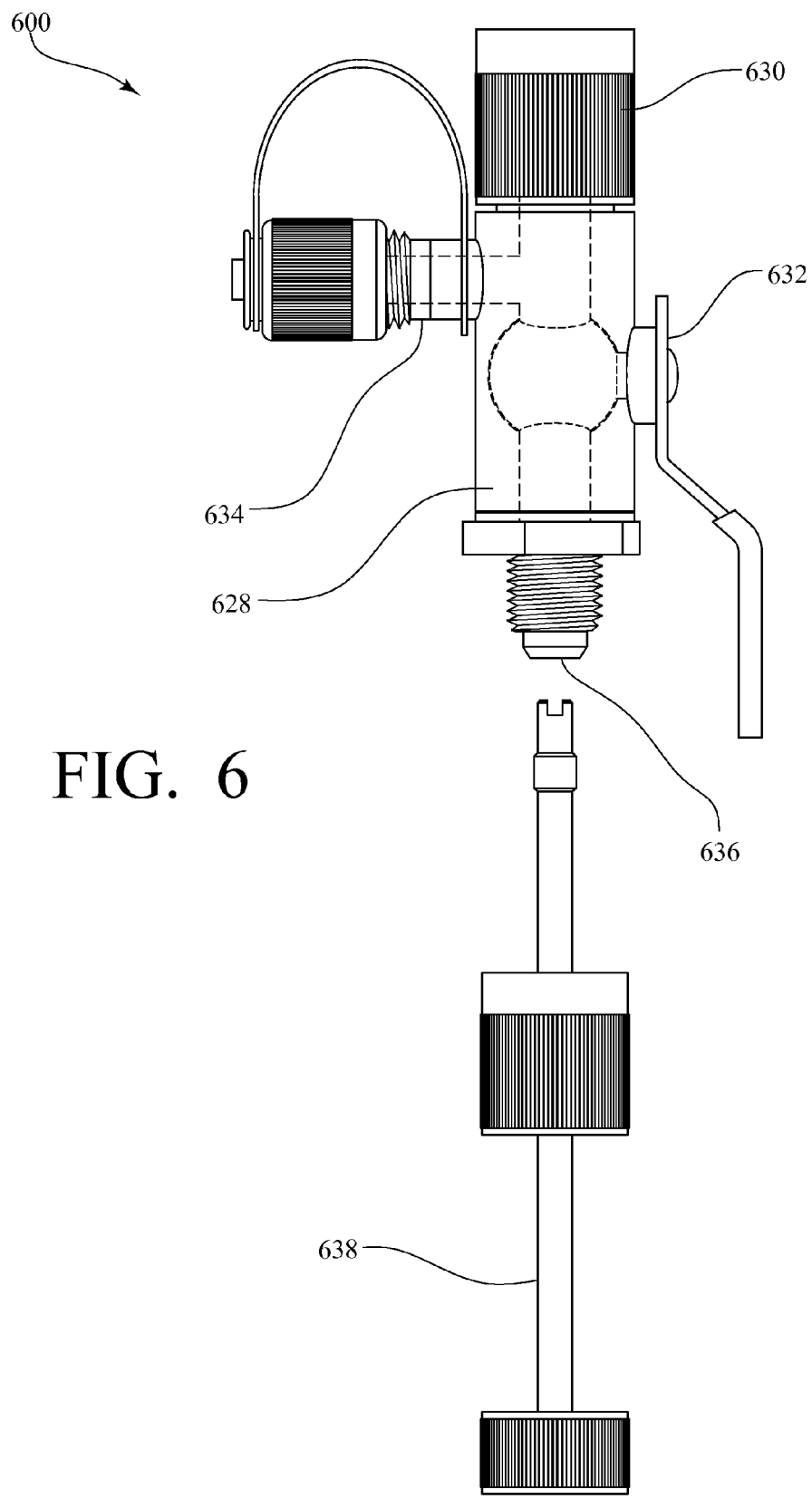
FIG. 6 is an exploded side view of an exemplary core removal tool assembly for use in a method for supplying fuel gas from an alternate fuel source to a fuel gas system, in accordance with an aspect of the invention.

Supplying Fuel Gas to Fuel Gas Systems while Maintenance is Performed Such as Meter and Regulator Replacement FIG. 6 shows an exemplary core removal tool 600 for use with the fitting 102 of FIG. 1 and the portable cylinder assembly 510 of FIG. 5 to supply fuel to a fuel gas system (e.g., FIG. 1, fuel gas system 100) while maintenance is performed such as replacement of a meter (e.g., FIG. 1, meter 110) and a regulator (e.g., FIG. 1, regulator 108). The core removal tool 600 includes a hollow body 628, a swivel connector 630 at one end of the body 628, a ball valve 632 at a middle of the hollow body 628, a fuel supply receiving port 634 between the swivel connector 630 and the ball valve 632, and a core removal rod receiving port 636 located at an opposite end of the hollow body 628 from the swivel connector 630. A core removal rod assembly 638 is received in the core removal rod receiving port 636 and passes through the ball valve 632 (in the open position) to the swivel connector 630.

Figure 7:
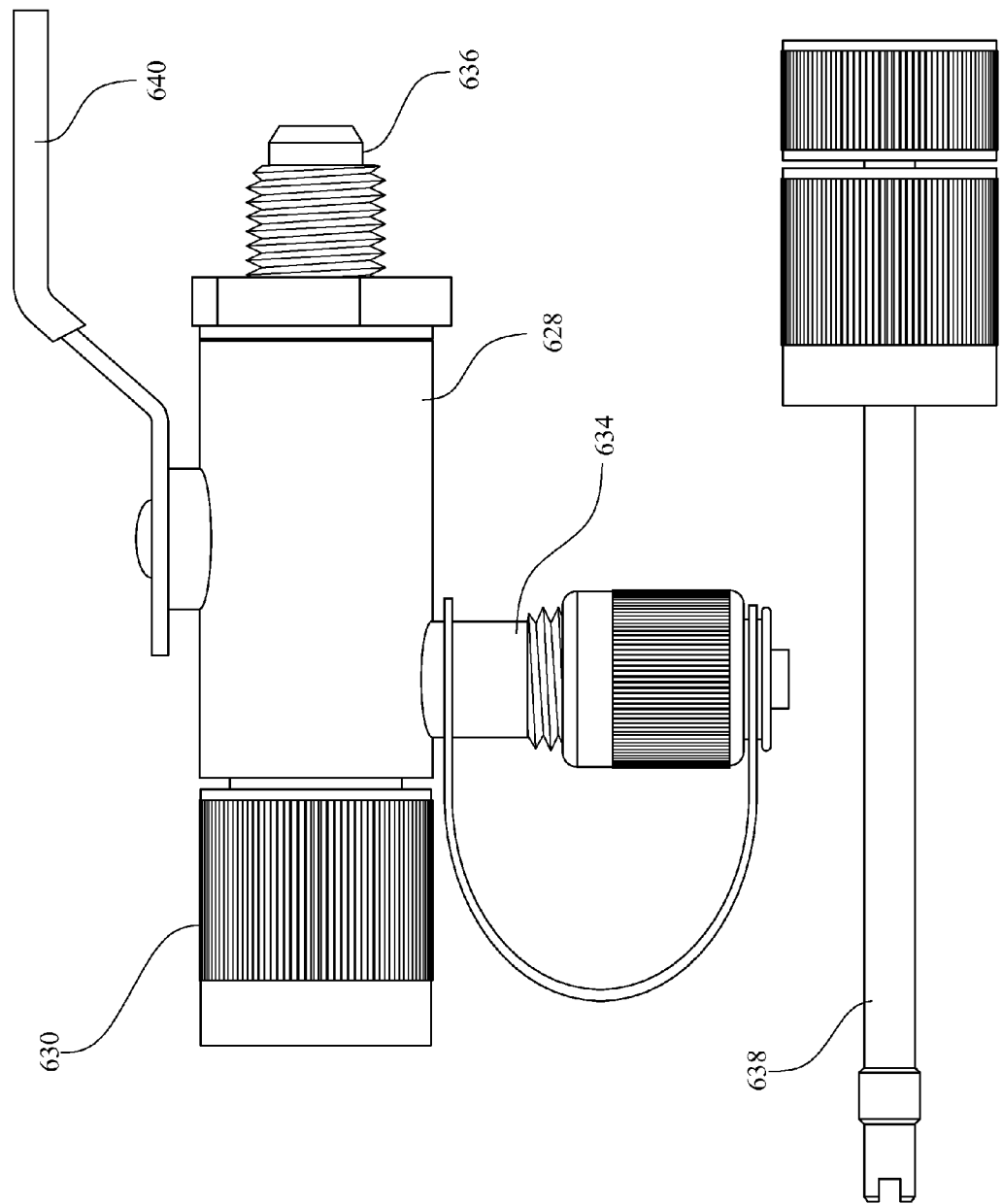
FIG. 7 is exploded side view of the exemplary core removal tool assembly of FIG. 6.
Figure 8:
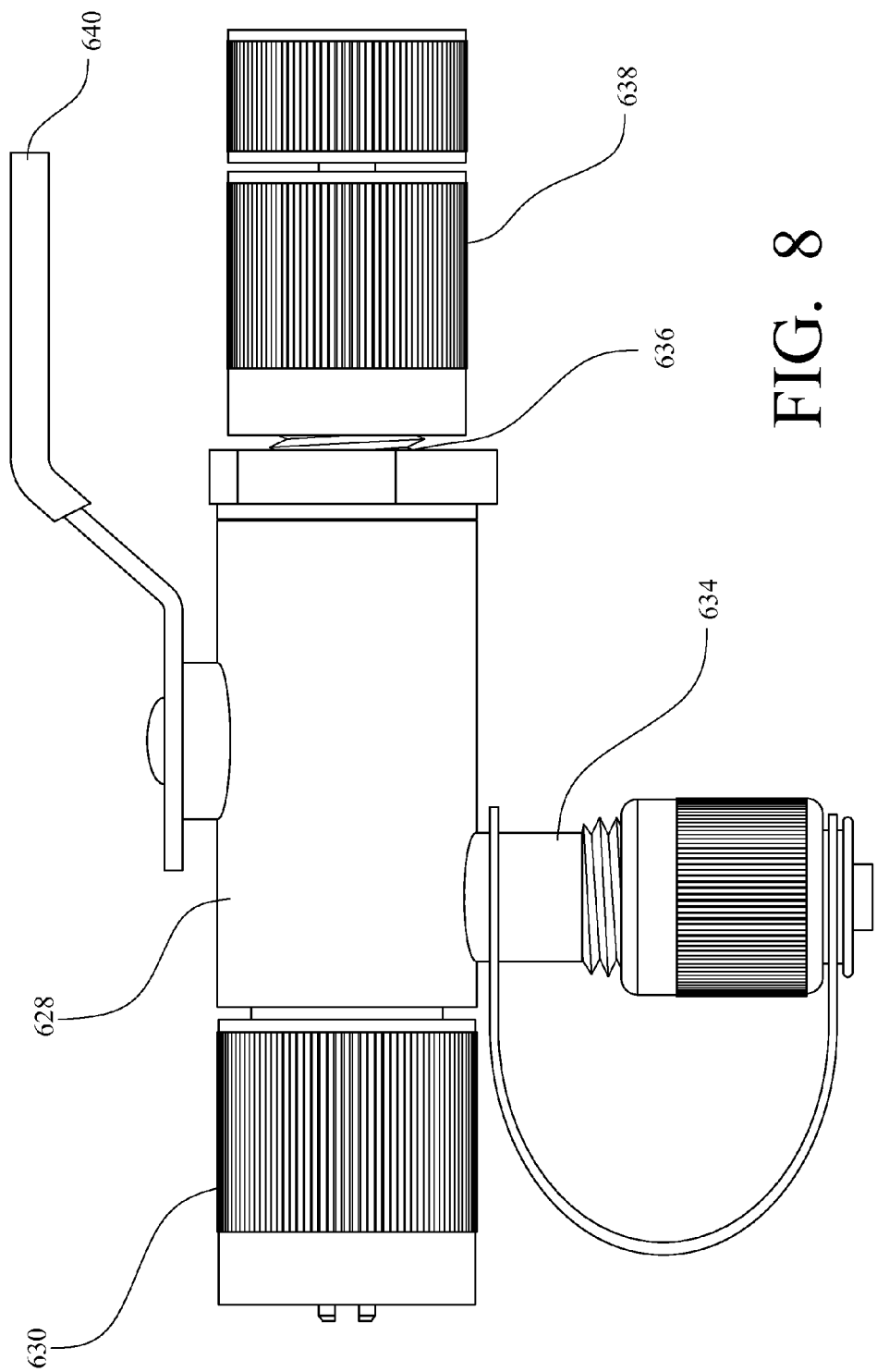
FIG. 8 is a non-exploded side view of the exemplary core removal tool assembly of FIG. 6.

FIG. 7 and FIG. 8 show the exemplary core removal tool 600, including the hollow body 628, the swivel connector 630, a handle 640 of the ball valve, the fuel supply receiving port 634, the core removal tool receiving port 636, and the core removal rod assembly 638.

Referring now to FIG. 1, FIG. 5, and FIG. 6, the portable cylinder assembly 510 is used with the core removal tool 600 to supply fuel gas to the fuel gas system 100 while maintenance is performed, such as meter and regulator replacement, according to the following sequence of steps.

In a first step, a gauge is attached directly to the fitting 102 to determine an operating pressure of the system to be serviced. This gauge is then removed.

Then, a regulator 526 having the appropriate operating pressure characteristics is connected to the compressed gas cylinder 512 (i.e., an alternate fuel supply) to provide adequate pressure to operate the system. Alternatively, if the first valve 104 includes a bypass port 117, the compressed gas cylinder 512 can be removed from the portable cylinder assembly 510 and the connector 514 attached directly to the bypass port 117 for using gas from the main supply 106 (i.e., acting as an alternate fuel supply) for supplying the system.

Then, the connector 524 of the portable cylinder assembly 510 is attached to the fuel supply receiving port 634 of the core removal tool 600, and the control valve 516 is opened to purge air out of the portable cylinder assembly 510.

Then, the core removal tool 600 is connected to the fitting 102, located downstream of the second valve 114 and downstream of the regulator 108 and the meter 110. The ball valve 632 on the core removal tool 600 is opened, and the reading of the gauge G is recorded.

With the ball valve 632 in the open position, the core 116 of the fitting 102 is removed from the fitting 102, allowing the portable cylinder assembly 510 to communicate with the fuel gas system 100 fully without restriction. The ball valve 632 is closed after the core 116 is retracted in the core removal tool 600 past the ball valve 632.

Then, the gauge G is observed for any changes.

With the fuel gas system 100 pressurized by compressed gas cylinder 512 or by gas from the main supply line 106, the second valve 114 is closed, thereby isolating the fuel gas system 100 from the meter 110 and the regulator 108.

The meter 110 and regulator 108 can now be removed and replaced while the fuel gas system 100 is supplied by the compressed gas cylinder 512 such that the customer system 112 remains pressurized, supplied, and operational (albeit at a functionality limited to the supply quantity, if used, of the compressed gas cylinder 512 e.g., nominal appliance burners and pilot lights, etc.).

Advantageously, as discussed above, the 13/64 inch bore 322 through the fitting body 302 will support 120,000 BTUs at 12" water column through the fitting body 302 with the valve core 116 removed.

After replacement of the meter 110 and the regulator 108, prior to tightening a swivel downstream of the meter, the first valve 104, which is located upstream of the regulator 108, is turned on to purge any air out of the fuel gas system 100 to that point. Then the bleeder valve 520 is opened on the portable cylinder assembly 510 to purge the remainder of the air from the fuel gas system 100 downstream of the first valve 104.

Then, the core 116 is replaced in the fitting 102 and the core removal tool is disconnected from the fitting 102.

The gauge can then be re-attached directly to the fitting 102, and a final system pressure reading taken and recorded.

A brass cap with a copper seal (not shown) is then placed on the fitting 102 and tightened.

Figure 9:
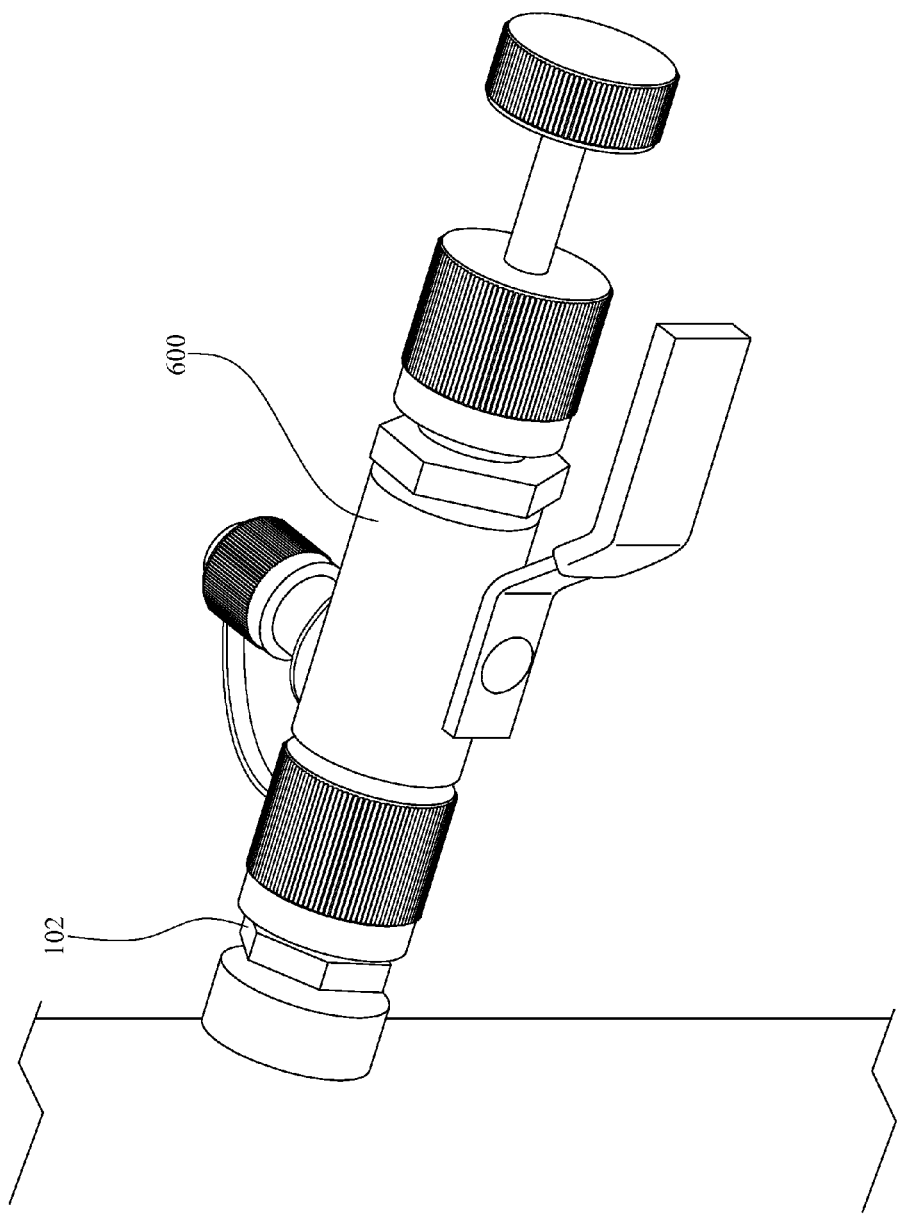
FIG. 9 is a perspective view of the exemplary core removal tool assembly of FIG. 6 attached to a fitting installed in an access port of a fuel gas system.

FIG. 9 shows the core removal tool 600 attached to a fitting 102 of a fuel gas system.

Figure 10:
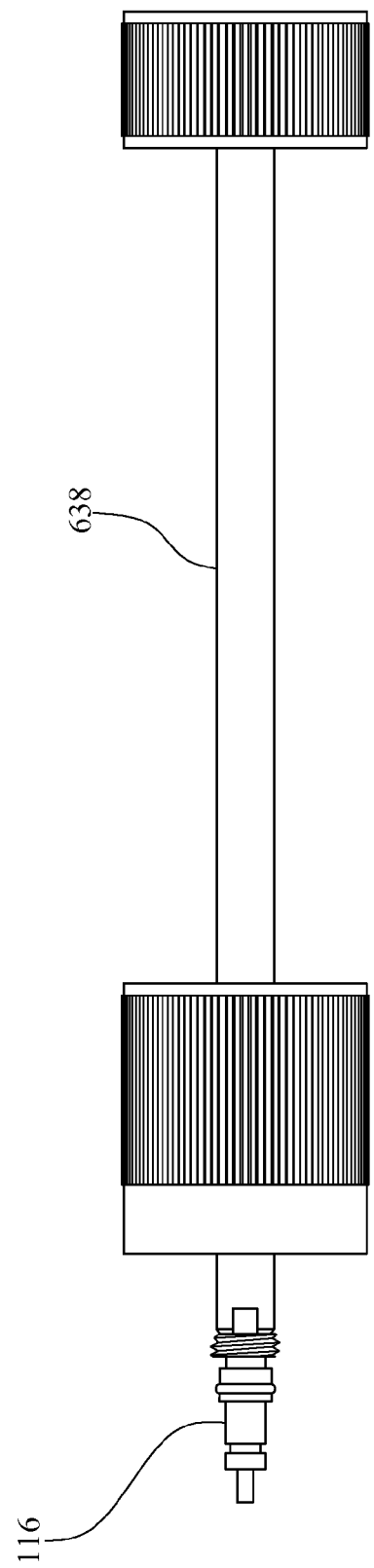
FIG. 10 is a side view of a core removal rod assembly of the exemplary core removal tool assembly of FIG. 6 and a valve core held therein.

FIG. 10 shows the core removal rod assembly 638 with a core 116 attached to an end thereof.

G. Application 5

Gas Meter Set with External Relief Valve Testing Method with Apparatus

Figure 11:
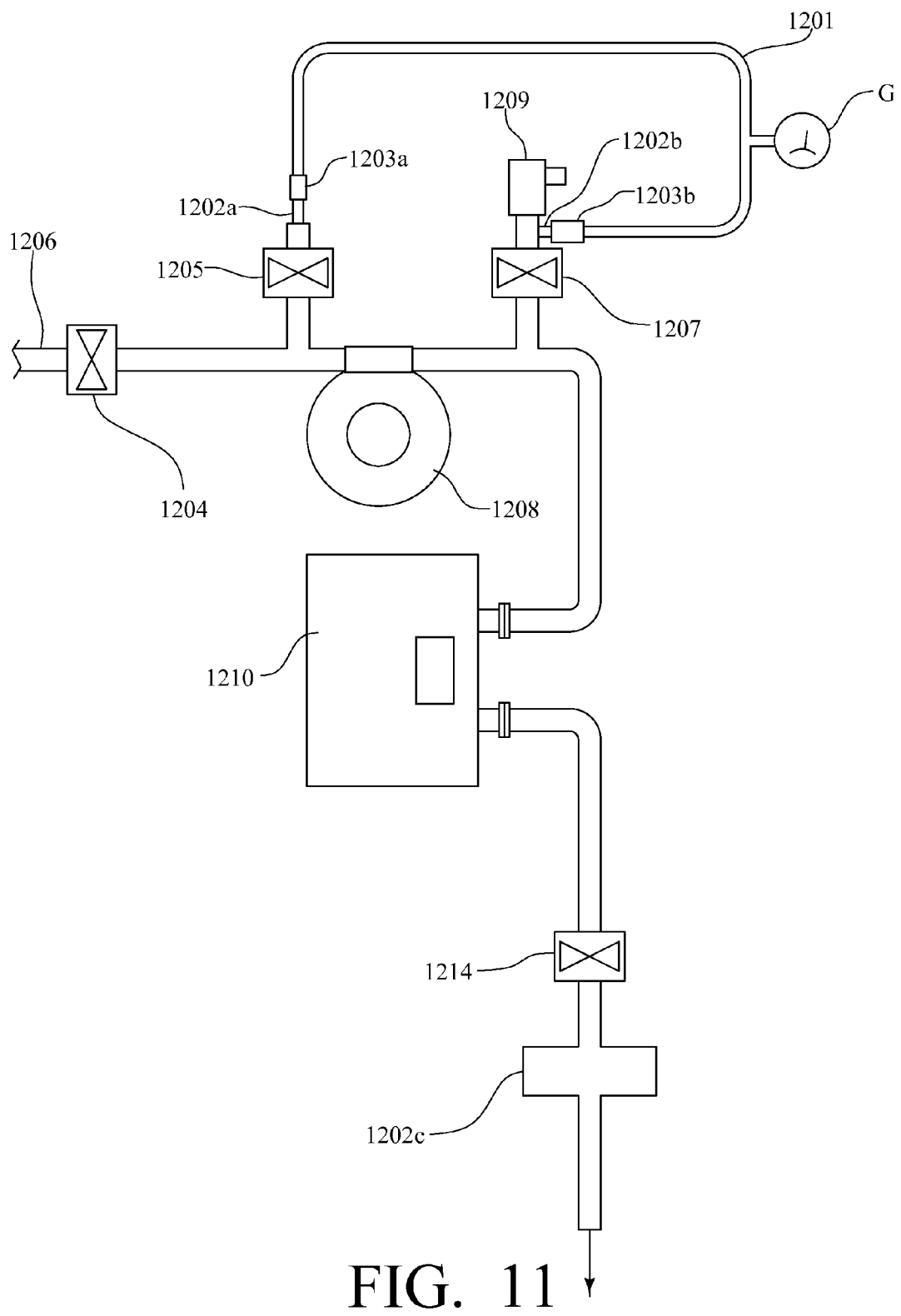
FIG. 11 is a piping diagram of an exemplary fuel gas system having an external relief valve, in accordance with an aspect of the invention.

FIG. 11 shows another application of a fitting 1202 according to the invention, used in an application for testing an external relief valve. As shown, a fuel gas system 1200 includes a main supply line 1206, a main gas valve 1204, an upstream valve 1205 upstream of a regulator 1208, to which a first fitting 1202*a* is attached, a downstream valve 1207 downstream of the regulator 1208, to which a second fitting 1202*b* and a relief valve 1209 are attached, a meter 1210 downstream of the regulator 1208, a customer system valve 1214 downstream of the meter 1210, and a third fitting 1202*c* downstream of the customer system valve 1214.

In use, a hose assembly 1201 including a hose, adapters 1203*a*, 1203*b* on each end, and a pressure gauge G is connected between the first fitting 1202*a* and the second fitting 1202*b*. The downstream valve 1207 is closed, and the upstream valve 1205 is slowly opened. The pressure at which the relief valve 1209 opens is then recorded. Advantageously, the testing method can be performed without breaking the system, and without tools (the quick adapters 1203*a*, 1203*b* are screwed on/off by hand), plugs, safety glasses, or gloves. When finished, the upstream valve 1205 is closed, the downstream valve 1207 is opened, the hose assembly 1201 is detached, and caps (not shown) are replaced on the fittings 1202*a*, 1202*b*.

The portable cylinder assembly 510, minus the portable cylinder 512 could be used as the hose assembly 1201 above, wherein the pressure gauge G is used to record the pressure at which the relief valve 1209 opens.

It is noted that the first fitting 1202*a* could be placed directly in the system 1200 without the use of the upstream valve 1205, and the main gas valve 1204 could be closed and then slowly opened to provide high pressure gas for testing the relief valve 1209, or the control valve 516 of the portable cylinder assembly 510 could be used to slowly increase the gas pressure applied to the relief valve 1209 until it reaches the point of discharge.

H. Conclusion

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A fuel gas system comprising:
    a fuel gas meter having a fuel input access port and a fuel output access port, the fuel gas meter metering a flow of natural gas or propane gas;
    a first fitting in communication with the fuel input access port; and
    a second fitting in communication with the fuel output access port;
    each of the first fitting and the second fitting including:
        a fitting body including: a first end for providing mating connection of the fitting body to the respective access port, a second end for providing connection of an accessory to the fitting body, and a central bore along a longitudinal axis thereof providing an opening completely through the fitting body between the first end and the second end; and
        a valve core removably received in a valve core receiving means in the fitting body and including a valve core body and a valve operator actuatable to push a fluoroelastomer washer away from the valve core body to open a fuel gas fluid connection between the first end and the second end;
    wherein a differential pressure across the fuel gas meter may be measured between the first fitting and the second fitting.

* * * * *